United States Patent
Yu (10) Patent No.: US 10,430,686 B2
(45) Date of Patent: Oct. 1, 2019

(54) SYSTEMS AND METHODS FOR ENHANCING IMAGE RECOGNITION TECHNIQUES USING PRIMARY AND SECONDARY FOCI

(71) Applicant: Verizon Patent and Licensing Inc., Arlington, VA (US)

(72) Inventor: Qiao Yu, McLean, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 177 days.

(21) Appl. No.: 15/647,142

(22) Filed: Jul. 11, 2017

(65) Prior Publication Data
US 2019/0019060 A1    Jan. 17, 2019

(51) Int. Cl.
*G06K 9/46*          (2006.01)
*G06K 9/62*          (2006.01)

(52) U.S. Cl.
CPC ......... *G06K 9/6215* (2013.01); *G06K 9/4609* (2013.01); *G06K 9/4652* (2013.01); *G06K 9/6202* (2013.01)

(58) Field of Classification Search
CPC ............. G06K 9/6215; G06K 9/00671; G06F 16/5838; G06F 16/583; G06F 16/51; G06T 7/74; G06T 2207/10016; G06T 5/50; G06T 7/248; A61B 3/14
USPC .................................. 382/203, 195
See application file for complete search history.

(56) References Cited

U.S. PATENT DOCUMENTS

| | | | |
|---|---|---|---|
| 6,445,822 B1 * | 9/2002 | Crill ....................... | G06K 9/522 382/218 |
| 9,122,706 B1 * | 9/2015 | Holzschneider ........ | G06F 16/51 |
| 2015/0220810 A1 * | 8/2015 | Mase .................... | G06K 9/6202 382/195 |

* cited by examiner

*Primary Examiner* — Charlotte M Baker (57) ABSTRACT

A system described herein may allow for the enhanced identification of candidate images that are similar to a reference image. For example, a primary focus and one or more secondary foci may be identified in the reference image (where a "focus" corresponds to a visual feature of the reference image). Characteristics (e.g., size, shape, color, etc.) of the secondary foci may be identified. Positional relationships of the secondary foci to the primary focus may also be identified. Candidate images may be scored based on whether they include the primary focus and one or more secondary foci, as well as whether the secondary foci match the characteristics and/or positional relationships of corresponding secondary foci in the reference image.

20 Claims, 9 Drawing Sheets

Locator not discernible using traditional image recognition techniques

FIG. 8A

Locator determined and selected based on primary and secondary foci

SYSTEMS AND METHODS FOR ENHANCING IMAGE RECOGNITION TECHNIQUES USING PRIMARY AND SECONDARY FOCI

BACKGROUND

Image recognition techniques are useful in many different fields, such as search engines, quality assurance, information technology (IT) security, software emulation, etc. Currently available techniques may identify the overall similarity of images in order to determine whether two particular images are the same and/or similar.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide for enhanced image recognition techniques, in which a primary focus and one or more secondary foci are identified in a reference image. For example, a set of candidate images may be analyzed to determine (1) whether the primary focus is present, (2) whether one or more of the secondary foci are present, (3) positional relationships (e.g., angle and/or distance) of the secondary foci to the primary focus, and (4) characteristics (e.g., color, size, shape, etc.) of the secondary foci. Based on these factors, the similarity of the candidate images, to the reference image, may be determined.

As used herein, the term "focus" (e.g., a primary focus or a secondary focus) may be a visual feature in an image. For instance, in an image that depicts a house and a tree, the house may be considered as a focus of the image, and the tree may be considered as another focus of the image. However, in various implementations, how a focus is defined may vary. For instance, in some implementations, the roof of the house may be considered as one focus, while the rest of the house may be considered as another focus.

The techniques described herein may be better at differentiating between similar candidate images, than techniques that do not take secondary foci into account when determining the similarity of images. For example, previous techniques may identify a primary focus, and may erroneously identify dissimilar images as similar.

Figure 1A:
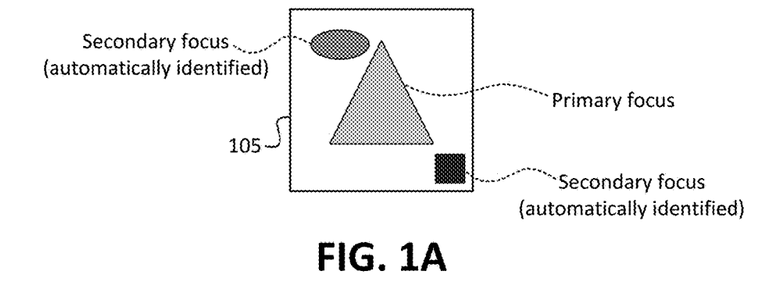
FIG. 1A illustrates an example reference image that includes a primary focus and multiple secondary foci.

As shown in FIG. 1A, reference image 105 may include a primary focus (i.e., the gray triangle shown in the figure), as well as two secondary foci (i.e., the dark gray oval and the black square shown in the figure). In some embodiments, the primary focus may be manually identified (e.g., by a user), while in other embodiments, the primary focus may be automatically identified (e.g., based on the size of the primary focus, the position of the primary focus in the image, and/or other factors).

Figure 1B:
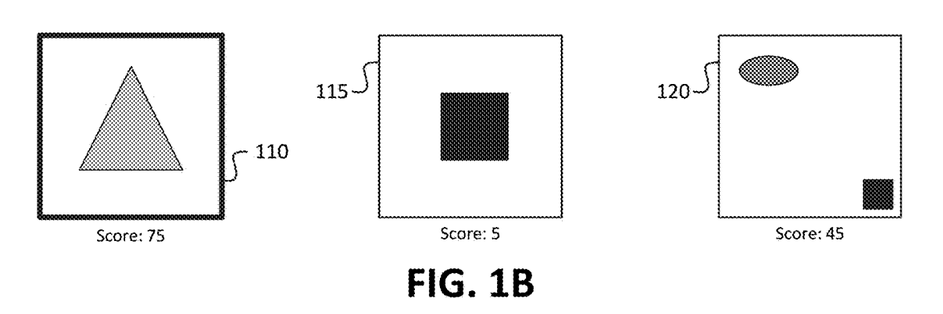
FIGS. 1B and 1C illustrate an example of scoring, according to one or more embodiments, the similarity candidate images to the reference image shown in FIG. 1A.

FIG. 1B illustrates a set of candidate images, which may be analyzed in order to determine similarity to the reference image. The candidate images may, in some embodiments, be scored (e.g., on a scale of 0-100), in order to indicate their similarity to the reference image. As shown, candidate image 110 may include a gray triangle, having the same position, size, and color as the gray triangle in the reference image. However, candidate image 110 may not include the secondary foci of the reference image (i.e., the dark gray oval and the black square). As also shown, candidate image 115 does not include the primary focus, but includes a version of one of the secondary foci, with different characteristics. Namely, candidate image 115 includes the black square, but in a different position and with a different size as in the reference image. Candidate image 120 may include both secondary foci, with the same characteristics and position within the image as in the reference image, but candidate image 120 does not include the primary focus.

Candidate images 110-120 may be scored based on these factors. For example, candidate image 110 may have a relatively high score (e.g., 75 out of 100), due to the fact the primary focus is present in candidate image 110. However, the score for candidate image 110 may be lower than the maximum score (i.e., 100 in this example) due to the fact that the secondary foci are not at all present in candidate image 110.

Candidate image 115 may be scored relatively low (e.g., 5 out of 100), due to the fact that the primary focus and one of the two secondary foci are missing entirely, and the secondary focus that is present has different characteristics than the same secondary focus in the reference image. However, the score for candidate image 115 may be a non-zero score (e.g., higher than the minimum score) due to the fact that one of the secondary foci is present, albeit with different characteristics than in the reference image.

Candidate image 120 may be scored relatively low (e.g., 45 out of 100), but higher than candidate image 115, due to the fact that the secondary foci are present and are in the same locations as in the reference image. However, the score for candidate image 120 may be negatively impacted by the fact that the primary focus is not present in candidate image 120. In some embodiments, the lack of the primary focus may automatically cause the score for candidate image 120 to be 0 (e.g., the minimum possible score). In other embodiments, the scoring may be adjusted such that candidate image 120 may be scored relatively highly, due to having the secondary foci with the same positional relationships to each other as in reference image 105, even though candidate image 120 is missing the primary focus.

In some embodiments, candidate images 110-120 may be ranked according to their scores, and the candidate image with the highest score (i.e., candidate image 110, in this example), may be selected as the most similar image to the reference image. In some embodiments, once the highest scoring candidate image is identified, the score may be compared to a threshold before the highest score candidate image is presented as the most similar image to reference image 805. For example, if the threshold score is 80, then none of candidate images 110-120 may ultimately be identified as the most similar image to the reference image.

Figure 1C:
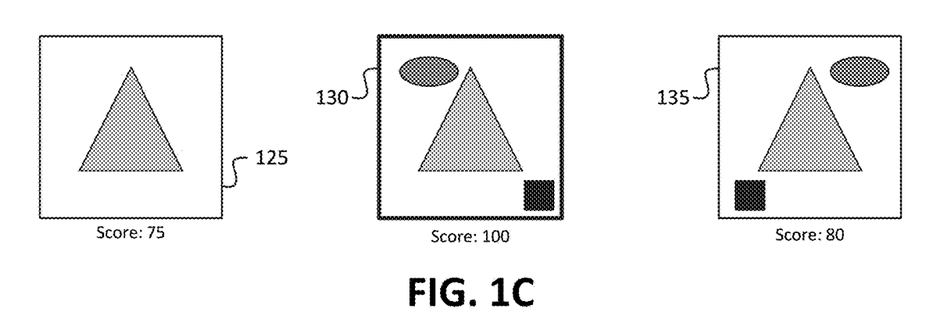

FIG. 1C illustrates another example, in which all of candidate images 125-135 include the primary focus of candidate image 105. These candidate images 125-135 may all have relatively high scores, due to the presence of the primary focus. However, the scores may differ based on the presence or lack of the secondary foci, positional relationships of the secondary foci (if present), and/or the characteristics of the secondary foci.

For example, candidate image 125 may have the lowest score of the three candidate images 125-135, due to the lack of the secondary foci. Candidate image 130 may have the highest score of the three candidate images, due to the presence of the primary focus and both of the secondary foci. In fact, candidate image 130 may have the highest possible score (e.g., 100 in this example), due to the secondary foci having the same positional relationship and characteristics as in candidate image 805. Candidate image 135 may have a lower score than candidate image 130, due to the secondary foci having a different positional relationship to the primary focus as in candidate image 105. Namely, the gray oval is located to the top right of the triangle in candidate image 135, as opposed to in the top left of the triangle in candidate image 105, and the black square is located to the bottom left of the triangle in candidate image 135, as opposed to the bottom right of the triangle in candidate image 105.

Although FIGS. 1A-1C are presented in a simplified manner with relatively shapes and colors, similar concepts can be applied to far more complex images (e.g., real life photos, complex art pieces, screen captures of movies, etc.), in order to provide applicability to a wide variety of applications.

Figure 2:
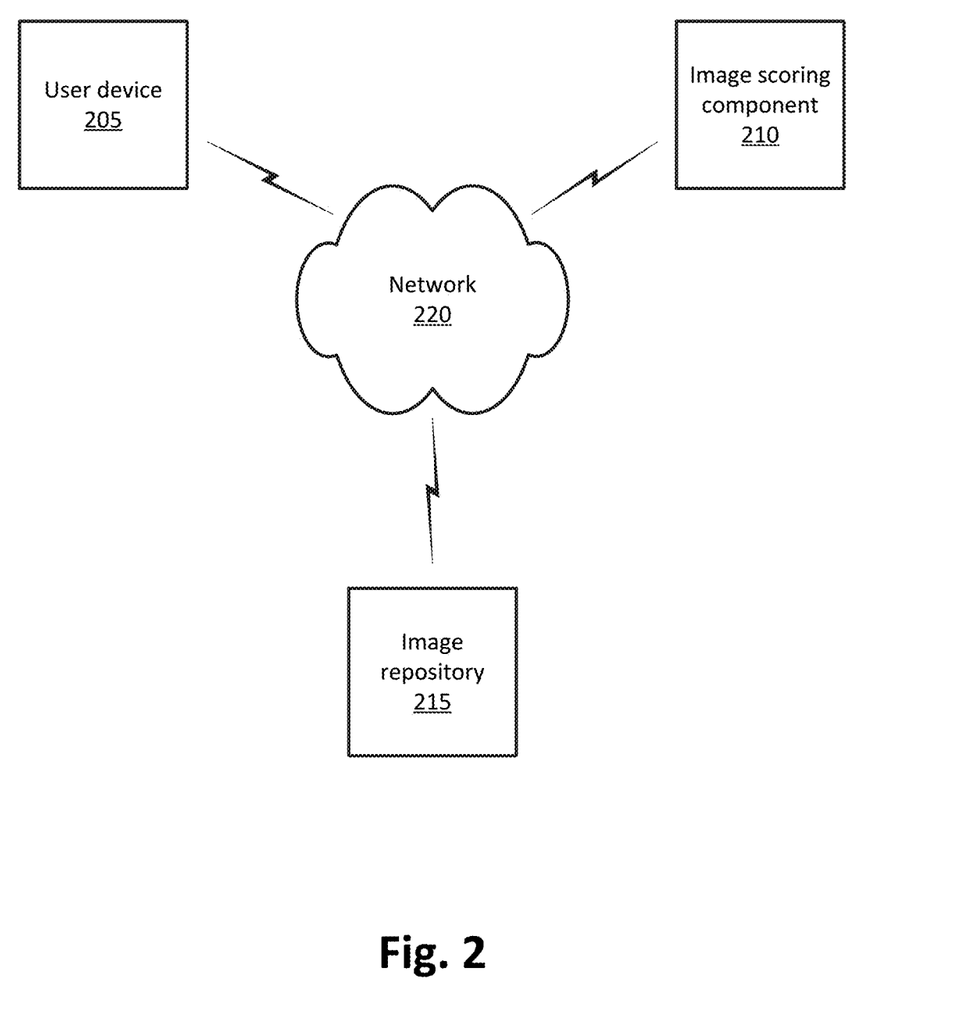
FIG. 2 illustrates an example environment in which one or more embodiments, described herein, may be implemented.

FIG. 2 illustrates an example environment 200, in which systems and/or methods described herein may be implemented. As shown in FIG. 2, environment 200 may include user device 205, image scoring component 210, image repository 215, and network 220.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via network 220 (and/or another network).

User device 205 may include any computation and communication device that is capable of communicating with one or more networks (e.g., network 220). For example, user device 205 may include a device that receives content, such as web pages (e.g., that include text content and/or image content), streaming audio and/or video content, and/or other content, via an Internet connection and/or via some other delivery technique. In some implementations, user device 205 may be, may include, or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

Image scoring component 210 may include one or more server devices (e.g., a single physical device or a distributed set of devices) that perform one or more operations (e.g., as described below) related to scoring images, including scoring how similar candidate images are to a given reference image. As further described below, the scoring may include identifying a primary focus in a reference image as well as one or more secondary foci, and analyzing one or more candidate images with respect to the determined primary and secondary foci of the reference image.

Image repository 215 may include one or more server devices (e.g., a single physical device or a distributed set of devices) that store images. As discussed below, the images stored by image repository 215 may be reference images and/or candidate images. Although shown as one element in FIG. 2, image repository 215 may represent multiple repositories owned and/or operated by multiple different entities. For example, image repository 215 may represent (1) an image repository owned and/or operated by an entity that owns and/or operates image scoring component 210, as well as (2) an image repository owned and/or operated by a separate entity, such as an entity that provides image search services.

Network 220 may include one or more radio access networks ("RANs"), via which user device 205 may access one or more other networks or devices, a core network of a wireless telecommunications network, an IP-based packet data network ("PDN"), a wide area network ("WAN") such as the Internet, a private enterprise network, and/or one or more other networks. In some implementations, network 220 may be, or include, a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 205 may connect, via network 220, to data servers, application servers, other user devices 205, etc. Network 220 may be connected to one or more other networks, such as a public switched telephone network ("PSTN"), a public land mobile network ("PLMN"), and/or another network.

Figure 3:
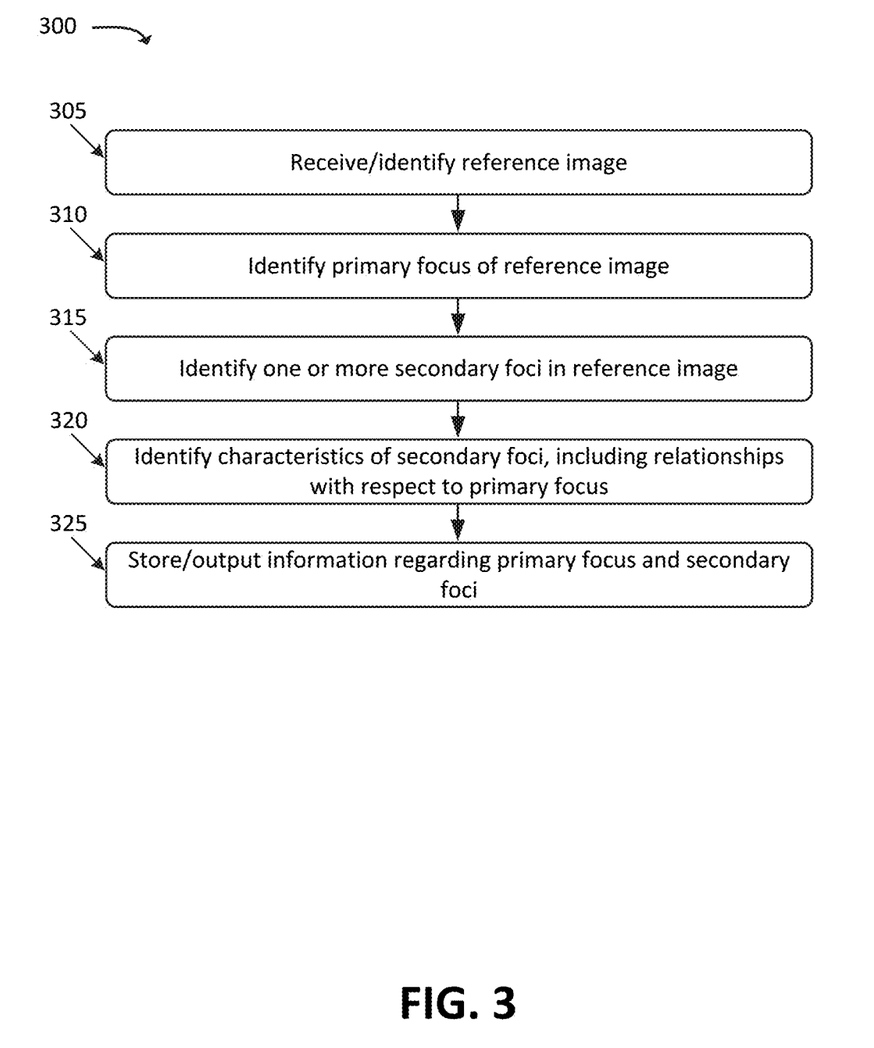
FIG. 3 illustrates an example process for identifying the primary and secondary foci of an image.

FIG. 3 illustrates an example process 300 for identifying the primary and secondary foci of an image. Process 300 may, in some embodiments, be performed by image scoring component 210 and/or one or more other devices (e.g., in concert with image repository 215).

As shown, process 300 may include receive and/or identifying (at 305) a reference image. For instance, image scoring component 210 may identify the reference image as part of an automated process, or the reference image may be specifically identified (e.g., selected or provided) by a user. The reference image may be an image against which other images (e.g., candidate images) are compared, in order to identify how similar the candidate images are to the reference image. When the reference image is identified as part of an automated process, the automated process may include iterating through images in a repository (e.g., image repository 215). When the reference image is identified by a user, the reference image may be identified via an image search (e.g., the user may provide the reference image into a user interface that is associated with image search functionality), and/or through some other software tool that provides an option for the user to provide the reference image.

Process 300 may also include identifying (at 310) a primary focus of the reference image. As alluded to above, the primary focus of the reference image may be a feature (e.g., a portion of the image) that could be considered to be the most "prominent" portion of the image. For example, in an image that includes a person standing in front of a crowd of other people, the person's face or body may be the primary focus.

In some embodiments, the primary focus may be specifically identified by a user (e.g., by receiving a selection). For instance, the user may use a graphical tool (e.g., a freehand selection tool, or a selection tool that has a preset shape, such as a rectangle or oval) to select the primary focus. In some embodiments, the user may simply select a point in the image, and the primary focus may be automatically determined based on using known image recognition techniques to identify a graphical feature that corresponds to the selected point. For instance, if the reference image includes a person's face and the user selects a point within the person's face, the person's face may be identified as the primary focus.

In some embodiments, the primary focus may be identified automatically. For instance, image scoring component 210 may identify one or more features of the image using known image recognition techniques, in which features may be identified based on having outlines, relatively uniform colors or shading as compared to other features in the image, etc. The primary focus may be automatically identified based on, for example, position within the image (e.g., a feature that is located in the center may be more likely to be the primary focus than features that are located on the outer edges of the image), size of the feature (e.g., a relatively large feature may be more likely to be selected as the primary focus than a feature that is smaller than other features of the image), focus (e.g., a feature that is in-focus (e.g., not blurry) may be more likely to be selected as the primary focus than a feature that is out-of-focus (e.g., blurry)), and/or other factors.

Process 300 may additionally include identifying (at 315) one or more secondary foci in the reference image. For example, similar to the identification of a primary focus (at 310), a user may identify one or more secondary foci (e.g., by using a selection tool), and/or image scoring component 210 may automatically identify the one or more secondary foci. For instance, features that are less prominent than the primary focus (e.g., features that are not in the center of the image, features that are smaller than the primary focus, features that are less in-focus than the primary image, etc.) may be identified as secondary foci of the reference image.

Process 300 may further include identifying (at 320) characteristics of the secondary foci, including relationships of the secondary foci to the primary focus. The characteristics of a particular secondary focus may include, for example, a shape of the primary focus, a size of the primary focus, a color (or colors) of the primary focus, and/or other type of characteristics which may be used to identify the primary focus using image recognition techniques (e.g., known image recognition techniques). In some implementations, the characteristics of a particular secondary focus may include a classification of the type (or types) of object associated with the secondary focus. For instance, image scoring component 210 may perform image recognition analysis (e.g., using known techniques) to identify that the secondary focus includes a house, an animal, a human, a car, and/or some other type of object.

Image scoring component 210 may also identify, for each secondary focus, a positional relationship of the secondary focus to the primary focus. For instance, image scoring component 210 may identify one or more reference points of the primary focus (e.g., a center of the primary focus, an edge of the primary focus, and/or some other reference point). Image scoring component 210 may also identify, for each secondary focus, one or more reference points of the secondary focus (e.g., a center of the secondary focus, an edge of the secondary focus, and/or some other reference point). Image scoring component 210 may identify an angle and/or a distance between the reference point of the primary focus and the reference point of the secondary focus. For instance, referring to the example shown in FIG. 1A, assuming that the center of the triangle is the reference point of the primary focus and the center of the oval is the reference point of that particular secondary focus, the oval may be considered to have a positional relationship of approximately $-30$ degrees and x distance units (e.g., pixels, millimeters, inches, and/or some other suitable unit of distance, where x is the actual distance in a given unit) with the triangle.

In some embodiments, the distance may be measured as a proportion of the size of the image, or as a proportion of the size of some other reference object (e.g., the primary focus). For instance, referring again to FIG. 1A, it may be determined that the straight-line distance of the oval from the center of the triangle is approximately $0.4*y$, where y is the vertical dimension of the reference image. As yet another example, it may be determined that the straight-line distance of the oval from the center of the triangle is approximately $0.2*h$, where h is the height of the triangle.

In some embodiments, image scoring component 210 may further determine the positional relationships that the secondary foci have with each other, in addition to (or, in some embodiments, in lieu of) their positional relationships with the primary focus. For instance, referring again to the example shown in FIG. 1A, it may be determined that the oval is a particular distance, with a particular angle, from the black square (e.g., from a center point of the black square).

Process 300 may also include storing and/or outputting (at 325) the identified information regarding the primary and secondary foci. For instance, image scoring component 210 may store the information indicating the primary focus, as well as the positional relationship of the secondary foci to the primary focus. In some embodiments, image scoring component 210 may output the information to another device. As will be described below, the information determined as a result of process 300 may be used in determining whether other candidate images are similar to the reference image.

Figure 4:
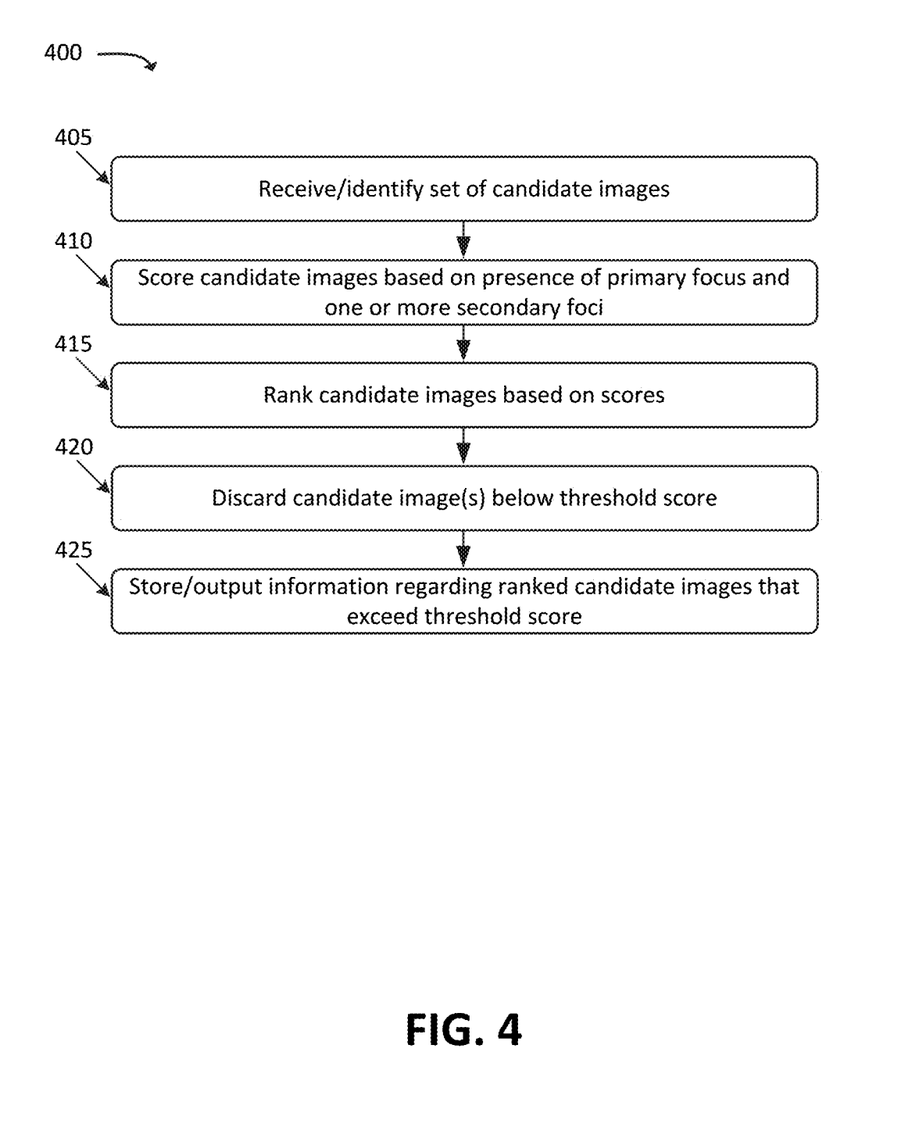
FIG. 4 illustrates an example process for scoring and ranking candidate images based on similarity of the candidate images to a reference image, based on identifying primary and secondary foci, in accordance with some embodiments.

FIG. 4 illustrates an example process 400 for identifying one or more candidate images that are similar to a reference image. Process 400 may be performed by image scoring component 210, and/or one or more other devices (e.g., image scoring component 210 in concert with image repository 215).

As shown, process 400 may include receiving and/or identifying (at 405) a set of candidate images. For example, image scoring component 210 may receive the set of candidate images as the result of a user providing the candidate images, such as via a software tool, via the selection of a web page (e.g., by way of the user navigating to a web page that includes the candidate images), etc. In some embodiments, image scoring component 210 may receive and/or identify the candidate images as part of an automated process. For instance, image scoring component 210 may perform a web crawling process, and may identify candidate images in web pages. As another example, image scoring component 210 may iterate through images stored by image repository 215, and may score (at 410) one or more of the images stored by image repository 215 against a reference image. In such an iterative process, image scoring component 210 may, for instance, treat one or more (or all) of the images stored by image repository 215 as a reference image, and score the other images against a given image, when that image is considered to be a reference image. Thus, the terms "reference image" and "candidate image" are relative, and a given image may be a candidate image in one context, while being a reference image in another context.

Process 400 may also include scoring (at 410) the candidate images based on the presence of the primary focus and/or secondary foci, of the reference image, in the candidate images. For example, as described below with respect to FIG. 5, image scoring component 210 may score each candidate image based on whether the primary focus is present in the candidate image, as well as whether the secondary foci are present and have the same characteristics and/or positional relationships as the secondary foci in the reference image. The candidate images may be scored on a normalized scale, such that the scores can be compared, and scores closer to one end of the scale (e.g., higher scores) may be indicative of the candidate image being more similar to the reference image than scores closer to the other end of the scale (e.g., lower scores). For instance, a candidate image with a score of 100 out of 100 may be (or may be considered) to be identical to the reference image, while a candidate image with a score of 0 out of 100 may be (or may be considered) to have absolutely no similarity to the reference image.

Process 400 may further include ranking (at 415) the candidate images based on the scores. For example, once the scores have been generated (at 410), image scoring component 210 may rank the candidate images in order of their respective scores. As may be apparent, the same set of candidate images may be scored, and accordingly ranked, differently for different reference images. That is, the scores and the rankings are generated for a candidate image with respect to a given reference image, and may be different for that same candidate image with respect to a different reference image.

Process 400 may additionally include (at 420) discarding any of the candidate images that are below a threshold score. The threshold may be used to avoid situations where a particular candidate image is the most similar to a reference image, out of a set of candidate images, but is not actually similar to the reference image in an absolute sense. For instance, if a given set of candidate images have scores of 12, 34, and 45 out of 100, respectively, this may indicate that none of the images are actually similar to the reference image. Assuming that the threshold is, for instance, 75 out of 100, then all of the candidate images would be discarded, in the above example. In some embodiments, image scoring component 210 may forgo comparing the candidate images to a threshold.

Process 400 may also include storing and/or outputting (at 425) information regarding the ranked candidate images that exceed the threshold score. For instance, image scoring component 210 may output information indicating which image (or images) is/are the highest-ranking images. In embodiments where the scores for the candidate images are compared to a threshold, image scoring component 210 may indicate only those candidate images that have exceeded the threshold. In some embodiments, image scoring component 210 may only store and/or output information regarding the highest-ranking candidate image (and/or a preset quantity of the highest-ranking candidate images, such as the candidate images with the top three scores). The information regarding the highest-ranking candidate image(s) can be used in a variety of ways. For instance, as described below with respect to FIGS. 6 and 7B, the ranking may be used in simulation environments, in which the interaction with a user interface by a user is simulated.

As mentioned above, FIG. 5 illustrates an example process 500 for scoring candidate images, with respect to a reference image, based on primary and secondary foci that have been identified in the reference image. Process 500 may be performed by image scoring component 210 and/or one or more other devices (e.g., image scoring component 210 in concert with image repository 215). Process 500 may be iteratively performed, for each candidate image, in a set of candidate images.

Figure 5:
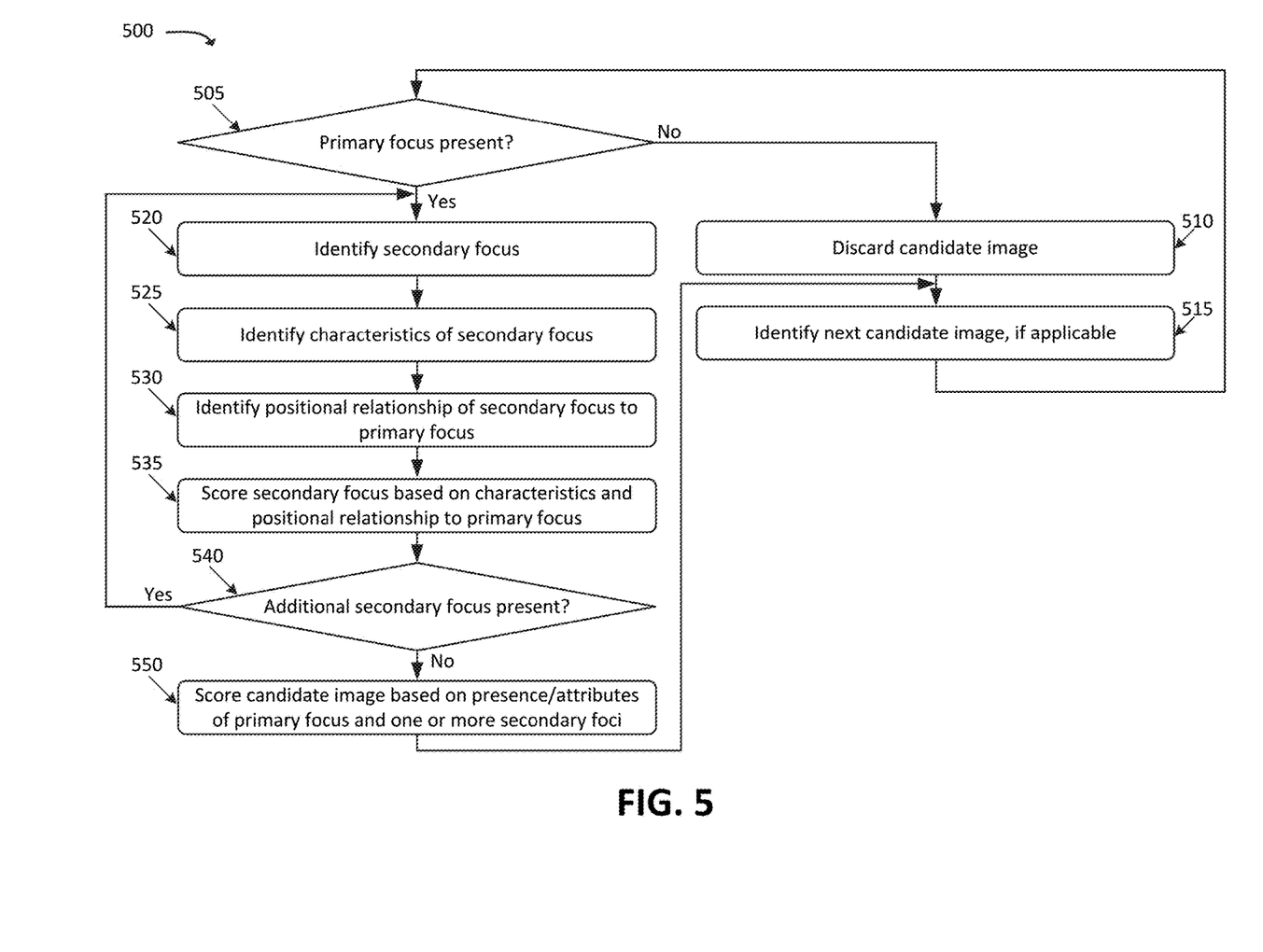
FIG. 5 illustrates an example process for scoring a particular candidate image, with respect to a reference image, based on identifying primary and secondary foci, in accordance with some embodiments.

As shown, process 500 may include determining (at 505) whether the primary focus, of a given reference image, is present in a particular candidate image. For example, image scoring component 210 may use image recognition techniques (e.g., known image recognition techniques) to identify whether the primary focus of the reference image (e.g., as determined in step 310, which may have been performed prior to the start of process 500, and/or may be performed concurrently with portions of process 500) is present in the candidate image.

When determining whether the primary focus is present in the candidate image, factors that may be considered include size of the primary focus, color of the primary focus, position of the primary focus within the image, and/or other factors. In various implementations, these factors may be weighted differently, in order to grant higher or lower levels of flexibility in determining whether the primary focus is present in the candidate image. For instance, it may be desired that the primary focus should only be considered as being present in the candidate image when an exact match is found (e.g., in the exact same position, with the same color, etc., as in the reference image). As another example, it may be desired that the primary focus may be considered as being present in the candidate image when a relatively close match is found, but not necessarily an exact match (e.g., the primary focus may be in a different position within the image, have different coloration, etc., as in the reference image). In some embodiments, image scoring component 210 may determine a score that indicates how closely the primary focus in the candidate image matches the primary focus in the reference image (e.g., where a maximum score indicates an exact match, while a minimum score may indicate an absence of the primary focus in the candidate image).

In some embodiments, when determining whether the primary focus is present in the candidate image, image scoring component 210 may determine whether the score (that indicates how closely the primary focus in the candidate image matches the primary focus in the reference image) exceeds a threshold. For instance, if the threshold is relatively high, this may indicate that the primary focus, in the candidate image, matches the primary focus in the reference image relatively closely. On the other hand, if the threshold is relatively low, this may indicate that the primary focus, in the candidate image, does not match the primary focus in the reference image relatively closely.

If the primary focus is not present (at 505—NO), then the candidate image may be discarded (at 510). For instance, image scoring component 210 may determine that the candidate image is dissimilar enough to the reference image, due to the lack of the primary focus in the candidate image (or if the aforementioned score is below a threshold score), that the candidate image should be removed from consideration. In such instances, image scoring component 210 may assign a preset score (e.g., a minimum score, such as 0 on a scale of 0 to 100) to the candidate image. Image scoring component 210 may identify (at 515) the next candidate image in the set, if the set contains any additional candidate images that have not been scored.

If, on the other hand, the primary focus is present in the candidate image (at 505—YES), then process 500 may include identifying (at 520) a secondary focus in the candidate image. For instance, as similarly discussed above with respect to the primary focus, image scoring component 210 may identify whether a particular secondary focus, of the reference image, is present in the reference image. For example, a score may be generated for one or more features in the candidate image, that indicates how closely the feature matches the given secondary focus. If the score is above a threshold, it may be determined that the secondary focus is present in the candidate image.

Process 500 may further include identifying (at 525) characteristics of the identified secondary focus in the candidate image. In some implementations, determining the characteristics may be a part of the identifying (at 520) whether the secondary focus is present in the candidate image. For example, as discussed above, the characteristics may include color, shape, size, and/or other characteristics.

Process 500 may additionally include identifying (at 530) relationship of the secondary focus to the primary focus in the candidate image. For example, as similarly described above with respect to block 320 of process 300, image scoring component 210 may determine a positional relationship (e.g., angle and distance) between the secondary focus (e.g., a reference point associated with the secondary focus) and the primary focus (e.g., a reference point associated with the primary focus).

Process 500 may further include scoring (at 535) the secondary focus based on the characteristics of the secondary focus and the positional relationship of the secondary focus to the primary focus. This score may generally indicate how closely the secondary focus, in the candidate image, matches a corresponding secondary focus in the reference image. For example, a relatively high score may indicate that the secondary focus closely matches the characteristics of the corresponding secondary focus in the reference image, as well as closely matching the positional relationship, of the primary focus in the candidate image, to the positional relationship of the primary focus in the reference image. A relatively low score may indicate that the secondary focus does not closely match the characteristics of the corresponding secondary focus in the reference image, and/or does not closely match the positional relationship, of the primary focus in the candidate image, to the positional relationship of the primary focus in the reference image.

Process 500 may also include determining (at 540) whether the set of secondary foci, associated with the candidate image, includes any additional secondary foci. Blocks 520-540 may performed in an iterative process, and repeated such that it may be determined whether any or all of the secondary foci, of the reference image, are present in the candidate image. If additional secondary foci are in the set of secondary foci associated with the reference image (e.g., secondary foci that have not yet been analyzed using the process of blocks 520-535), then process 500 may return to block 520, in order to continue analyzing the candidate image for the presence of secondary foci.

If, on the other hand, no additional secondary foci need to be analyzed (at 540—NO), then process 500 may include scoring the candidate image (e.g., generating an overall score for the candidate image) based on the presence and/or attributes of the primary focus and the secondary foci. For example, image scoring component 210 may score the candidate image based on the scores determined for the primary focus (at 505) and/or the secondary foci (at 535). In some embodiments, the overall score for the candidate image may be an average of the scores for the primary focus and the secondary foci. In some embodiments, the score for the primary focus may be weighted more heavily (or less heavily) than the scores for the secondary focus, when determining the overall score for the candidate image. In some embodiments, different secondary foci may be weighted differently when determining the overall score for the candidate image. For instance, secondary foci that are larger, or are closer to the primary focus, may be weighted more heavily than other secondary foci when generating the overall score.

Figure 6A:
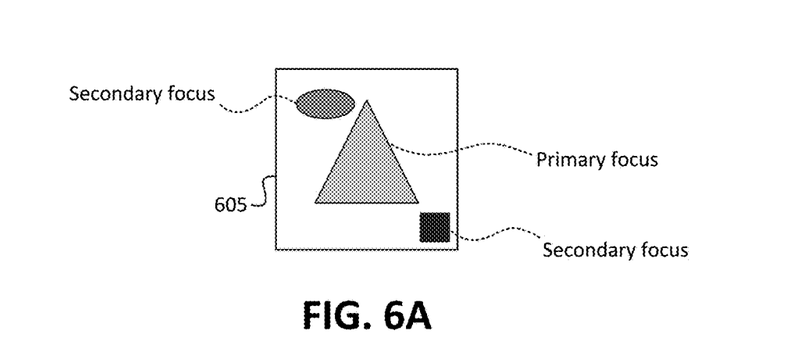
FIGS. 6A-6C illustrate example embodiments in which positional relationships and/or characteristics of secondary foci may be weighted differently when scoring candidate images.
Figure 6B:
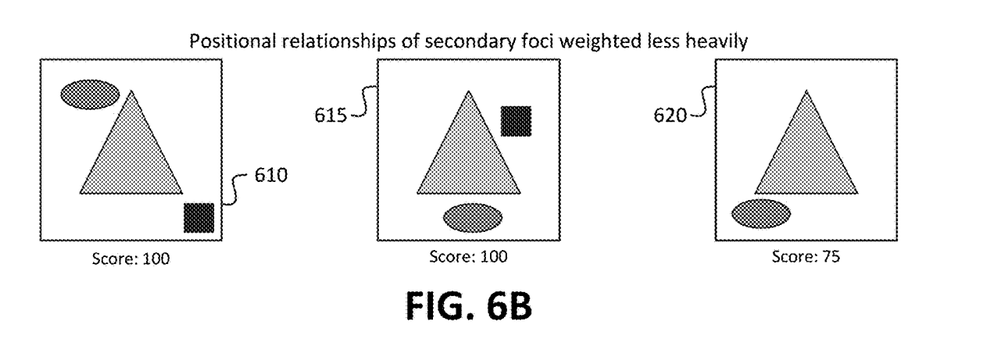
Figure 6C:
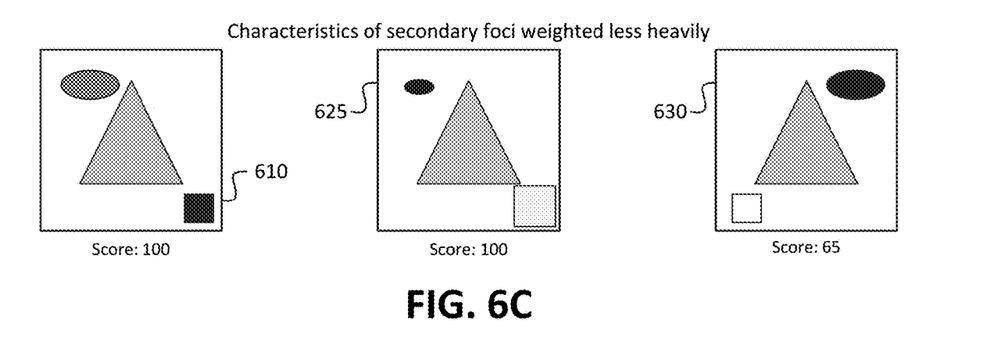

FIGS. 6A-6C illustrate an example of how positional relationships and/or characteristics may be weighted less heavily in generating the overall score for a candidate. FIG. 6A shows an example reference image 605, which may be the reference image against which a set of candidate images are scored. As shown, reference image 605 may include a primary focus (a large triangle in the center of the image), and two secondary foci (an oval at the top left of the image and a square at the bottom right of the image).

FIG. 6B illustrates an example of how the positional relationships of the secondary foci, in candidate images 610-620, may be weighted less heavily when generating an overall score for the candidate images. For the sake of explanation, the primary focus in candidate images 610-620 is identical to the primary focus in reference image 605.

Candidate image 610 may have an overall score of 100 out of 100, as the secondary foci share the same characteristics as the corresponding secondary foci in the reference image (i.e., the oval in candidate image 610 has the same size, shape, and color as the oval in reference image 605, and the square in candidate image 610 has the same size, shape, and color as the oval in candidate image 610), and the same positional relationships with respect to the primary focus as in reference image 605.

Candidate image 615 may also have an overall score of 100 out of 100, despite the secondary foci being situated differently in candidate image 615 than in reference image 605 (e.g., having different positional relationships with the primary focus and/or with each other). That is, in this example, the positional relationships of the secondary foci may be weighted less heavily, or not counted at all, when generating the overall score for candidate image 615.

Candidate image 620 may have an overall score of 75 out of 100 (e.g., a relatively high score, but not a maximum score). As shown, candidate image 620 may include only one of the secondary foci (i.e., the oval, but not the square), which may negatively impact the overall score for candidate image 620. As also shown, the oval may be situated differently in candidate image 620 than in reference image 605. However, due to the positional relationship being weighted less heavily (or not at all), the different positional relationship of the oval to the triangle, in candidate image 620 than in reference image 605, may not have as large an impact on the overall score than if the positional relationship were weighted more heavily.

FIG. 6C illustrates an example of how the characteristics of the secondary foci may be weighted less heavily when generating the overall scores for a set of candidate images 610, 625, and 630. As with the example of FIG. 6B, candidate image 610 may have an overall score of 100 out of 100, due to being identical to reference image 605. Candidate image 625 may also have an overall score of 100 out of 100, despite the secondary foci having different characteristics than the corresponding secondary foci in reference image 605. For instance, the oval may be smaller and darker in candidate image 625 than in reference image 605, and the square may be larger and lighter in color in candidate image 625 than in reference image 605. Despite these differences, the positional relationships of the oval and the square may be the same in candidate image 625 as in reference image 605. Because the characteristics of the secondary foci (e.g., the size and color) may be weighted less heavily (or not at all), and because the positional relationships of the secondary foci are the same in candidate image 625 as in reference image 605, candidate image 625 may have a relatively high overall score (e.g., 100 out of 100 in this example).

In some embodiments, one type of characteristic may be weighted differently than another characteristic. For instance, in this example, the color and the shape are both weighted less heavily (or not at all). In some embodiments, the color may be more heavily weighted than the size, or vice versa. For instance, in such embodiments, the overall score of candidate image 625 may be negatively impacted due to the colors of the oval and the square being different than in reference image 605, but not because the sizes of the oval and the square are different than in reference image 605.

Candidate image 630 may have a relatively high overall score (but not a maximum overall score), because the positional relationships of the oval and the square are different in candidate image 630 than in reference image 605. That is, the overall score for candidate image 630 may be negatively impacted due to the different positional relationships of the secondary foci, but not necessarily (or less so) negatively impacted due to the different colors and/or sizes of the oval and the square.

Returning to FIG. 5, in some embodiments, the overall score may be based on one or more other factors. For example, image scoring component 210 may determine the positional relationships of the secondary foci, in the candidate image, with respect to each other, and compare these positional relationships with the positional relationships of corresponding secondary foci in the candidate image. For instance, referring to the examples shown in FIG. 1A and FIG. 1C, the positional relationships of the oval and the square, to each other, in candidate image 130, may be the same (or similar) to the positional relationships of the oval and square, to each other, in reference image 105. The overall score (e.g., 100 out of 100 in this example) may have been determined based on the same positional relationships of the oval and the square (e.g., in addition to the other factors discussed above, including the size and shape of the oval and the square, and the respective positional relationships of the oval and square with the triangle (the primary focus in this example)).

Once the candidate image has been scored, the next candidate image may be identified (at 515), and process 500 may be repeated in order to score the next candidate image. As discussed above, once the candidate image is scored, the overall score may be compared to overall scores for other candidate images, in order to determine which candidate image, or images, most closely match the reference image.

While process 500 is discussed in the context of first identifying a secondary focus, in a set of secondary foci associated with a reference image, and then identifying whether the secondary focus is present in a candidate image, similar concepts may be applied in different embodiments. For instance, in some embodiments, features in the candidate image may be identified, and compared to the secondary foci in order to determine whether a particular feature of the candidate image matches (or matches within a threshold) a particular secondary feature of the reference image. For each feature identified in the candidate image, a score may be generated, which indicates the similarity of the feature to a particular secondary focus of the reference image. The feature with the highest such score (and, optionally, if the score is above a threshold score) may be identified as the corresponding secondary focus in the candidate image.

Figure 7:
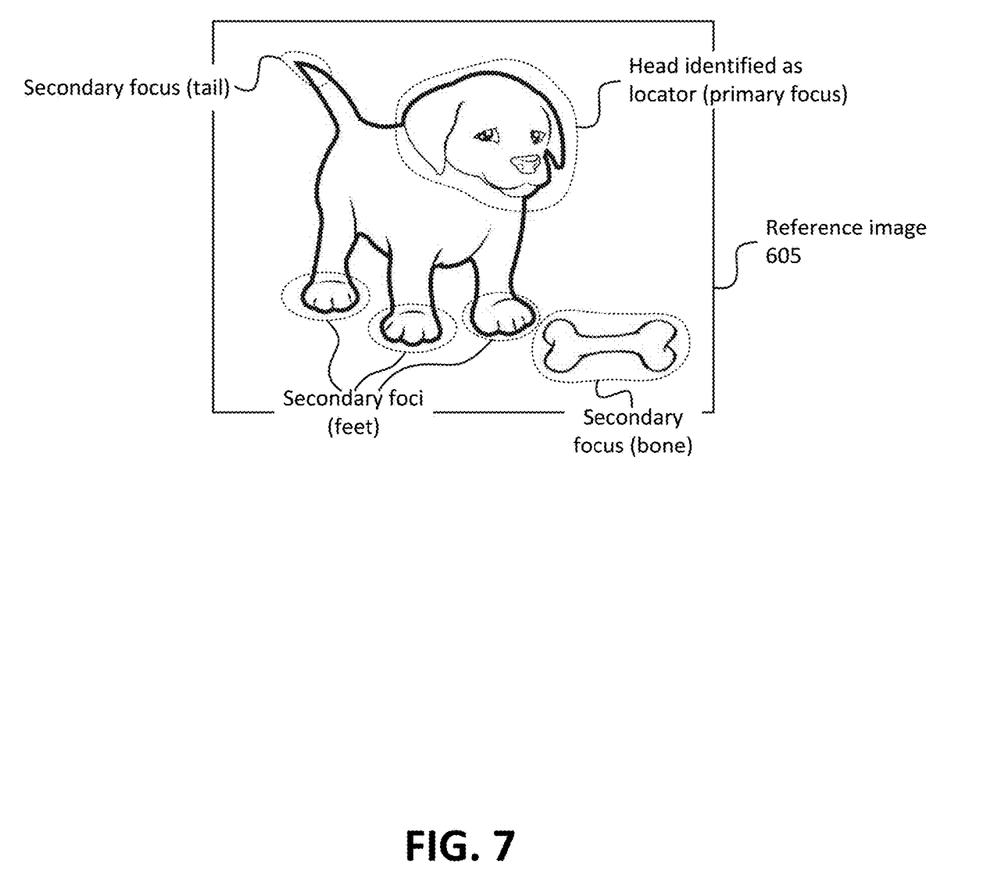
FIG. 7 illustrates an example image in which a primary focus is used as a locator for an automation technique.
Figure 8A:
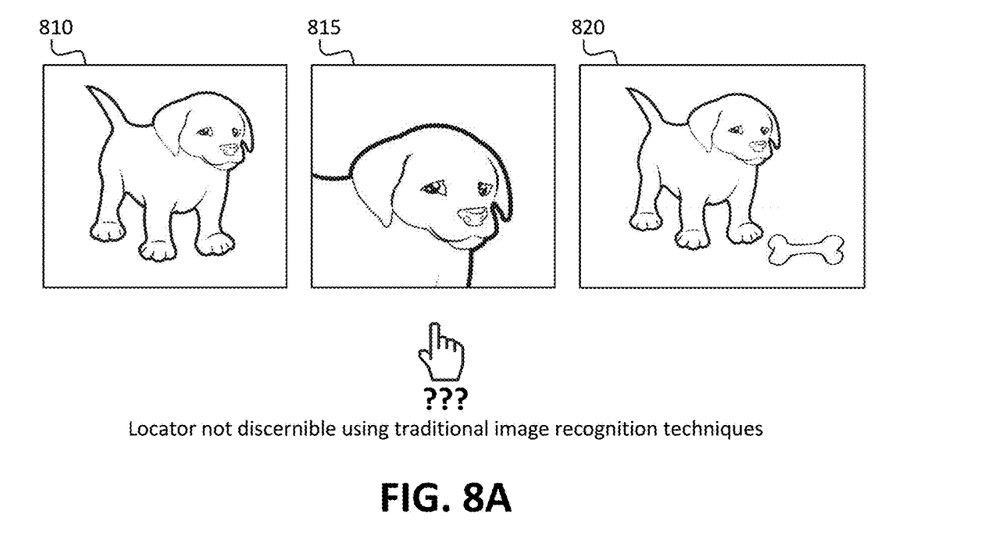
FIG. 8A illustrates an example of how traditional image recognition techniques may fail in identifying which image to select, based on the locator identified in FIG. 7.
Figure 8B:
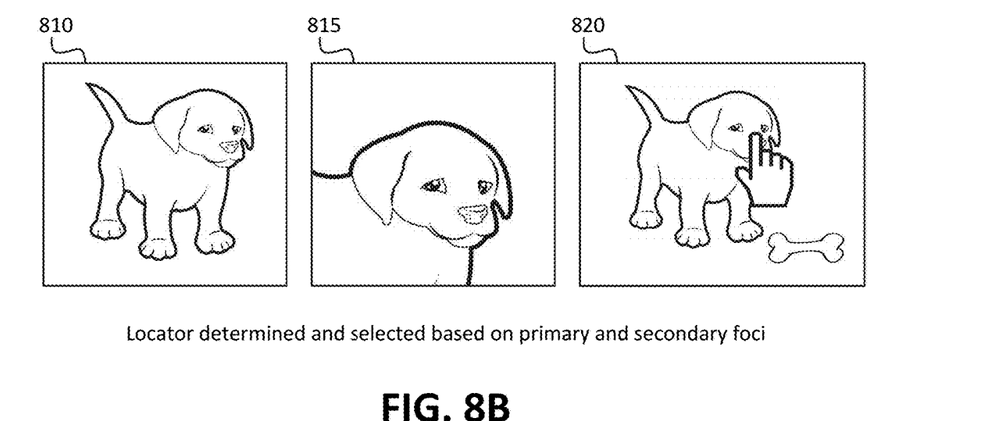
FIG. 8B illustrates an example embodiment in which a candidate image may be properly identified for selection based on primary and secondary foci.

FIGS. 7, 8A, and 8B illustrate an example of how the techniques described above may be applied in a simulation environment (e.g., where user inputs are simulated using a locator). Generally, a locator is used to indicate where a user may make a selection (e.g., a click). Using locators in a simulation scenario, the interactions of users can be simulated numerous (e.g., hundreds, thousands, millions, etc.) times.

FIG. 7 shows a reference image, which may include a puppy standing next to a bone. The head of the puppy may be identified (e.g., by a user, such as a developer who is designing a simulation) as a locator. Based on this selection, the head of the puppy (i.e., the locator) may be identified as the primary focus of the image. Other features of the image may also be identified (e.g., automatically using image recognition/analysis techniques, and/or manually by the user) as secondary foci. For example, three of the puppy's feet and its tail may be identified as secondary foci, and the bone may also be identified as a secondary focus.

FIG. 8A illustrates an example of how traditional techniques may fail to properly discern the locator, in a page (e.g., a web page) where multiple similar images are present. For example, candidate images 810-820 may be present on a web page in which the simulation of user interaction is desired to be tested. Based simply on identifying whether the locator is present, traditional image recognition techniques may fall short, because the locator is present in each of candidate images 810-820. Thus, while candidate image 820 may be the sole intended candidate image to be selected, some implementations may cause each candidate image 810-820 to be selected (i.e., the head of the puppy may be selected/interacted with in each of the candidate images). In other implementations, only one of the candidate images may be selected (e.g., the first candidate image on the page, candidate image 810, which is not the intended candidate image).

FIG. 8B illustrates an example of how the techniques, described above, may aid in selecting the intended candidate image (and only the intended candidate image). For example, candidate image 820 may be properly identified, due to the primary focus (the puppy's head) being present, as well as the secondary foci (i.e., the puppy's feet and tail, and the bone) also being present and sharing the same characteristics/positional relationships as reference image 705. Candidate image 810 may be properly identified as not the intended candidate image, due to the fact that candidate image 810 does not have the bone in the image, while candidate image 820 does have the bone. It should be noted that while FIG. 8B is described in the context of a candidate image that is identical to a reference image, similar techniques may be used in scenarios where the candidate image is not identical to the reference image.

Figure 9:
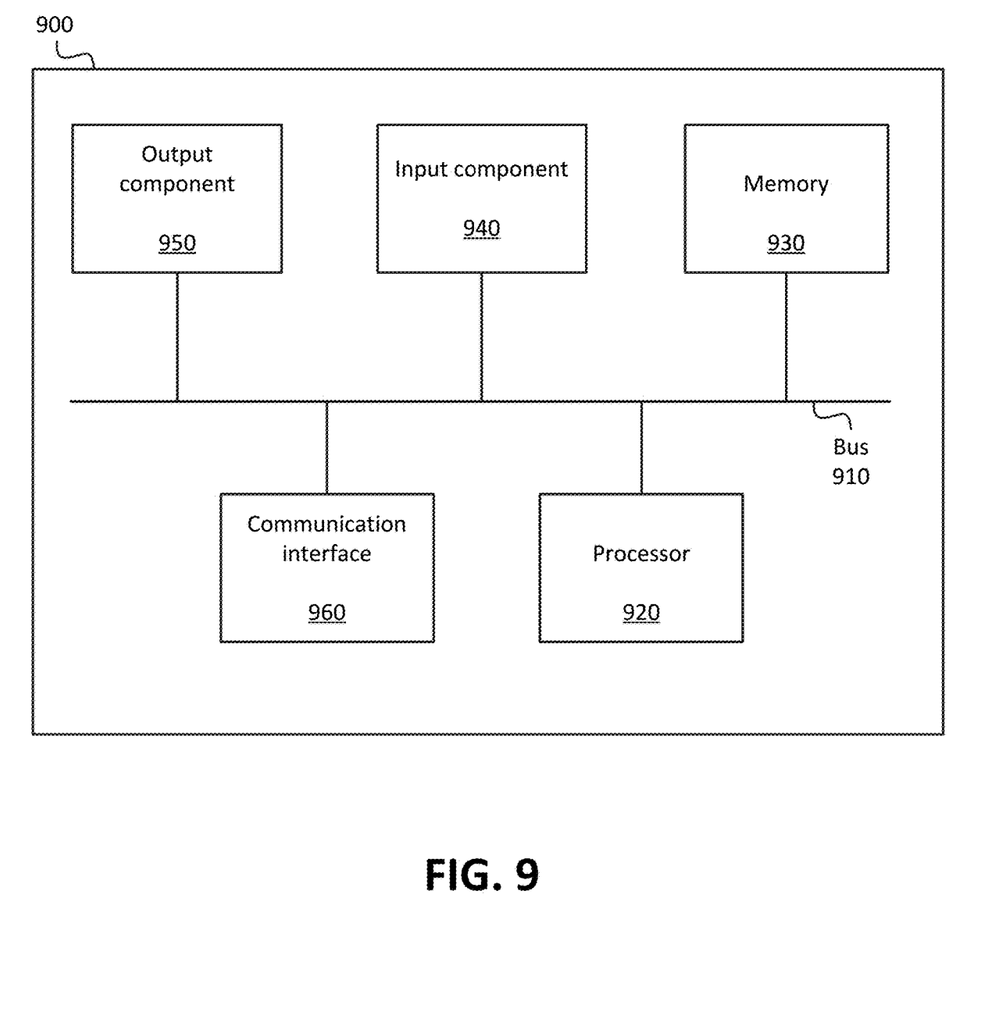
FIG. 9 illustrates example components of one or more devices, according to one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of signals have been described with regard to FIGS. 1-3, the order of the signals may be modified in other implementations. Further, non-dependent signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
use one or more image recognition techniques to automatically identify, in a reference image, a primary focus of the reference image, the primary focus being a first feature of the reference image;
use the one or more image recognition techniques to automatically identify, in the reference image, one or more secondary foci of the reference image, the secondary foci including at least a second feature of the reference image;
use the one or more image recognition techniques to automatically identify at least one of:
characteristics of at least one of the one or more secondary foci of the reference image, or
a positional relationship of the at least one of the one or more secondary foci to the primary focus;
score a set of candidate images based on the identified primary focus and the one or more secondary foci, the scoring for a particular candidate image, in the set of candidate images, being based on at least one of the following factors:
whether the particular candidate image includes the primary focus,
whether the particular candidate image includes the one or more secondary foci,
whether characteristics, of a particular secondary focus included in the candidate image, match characteristics of a corresponding secondary focus included in the reference image, or
whether a positional relationship, of the particular secondary focus included in the candidate image, matches a positional relationship of the corresponding secondary focus included in the reference image; and
rank the set of candidate images based on the scoring.

2. The device of claim 1, wherein the processor-executable instructions, to identify the positional relationship of a particular secondary focus, in the reference image, to the primary focus, include processor-executable instructions to determine:
an angle between a reference point associated with the particular secondary focus and a reference point associated with the primary focus, and
a distance between the reference point associated with the particular secondary focus and the reference point associated with the primary focus.

3. The device of claim 1, wherein the processor-executable instructions, to identify the characteristics of a particular secondary focus, of the reference image, include processor-executable instructions to identify:
a size of the particular secondary focus,
a shape of the particular secondary focus, or
one or more colors associated with the particular secondary focus.

4. The device of claim 1, wherein the processor-executable instructions, to score the particular candidate image based on whether characteristics, of a particular secondary focus included in the candidate image, match characteristics of a corresponding secondary focus included in the reference image, include processor-executable instructions to:
identify the corresponding secondary focus, included in the reference image, as corresponding to the particular secondary focus included in the candidate image based on identifying that the corresponding secondary focus, included in the reference image, is a most similar secondary focus, of the one or more secondary foci of the reference image, to the particular secondary focus included in the candidate image.

5. The device of claim 1, wherein the processor-executable instructions, to score the particular candidate image, include processor-executable instructions to:
weight a particular one of the factors more heavily than another one of the factors when generating the score.

6. The device of claim 1, wherein the processor-executable instructions, to score the particular candidate image, include processor-executable instructions to:
score a plurality of features, associated with the particular candidate image, according to at least one of the factors, with respect to corresponding secondary foci of the reference image,
wherein the score for the particular candidate image is based on the scores for each of the plurality of features of the candidate image.

7. The device of claim 1, wherein the processor-executable instructions further include processor-executable instructions to:
receive information indicating that the primary focus of the reference image is associated with a locator;
identify a highest scoring candidate image, based on the ranking; and
perform an automated selection on a portion of the highest scoring candidate image, based on the locator associated with the primary focus of the reference image.

8. A method, comprising:
using one or more image recognition techniques to automatically identify, in a reference image, a primary focus of the reference image, the primary focus being a first feature of the reference image;
using the one or more image recognition techniques to automatically identify, in the reference image, one or more secondary foci of the reference image, the secondary foci including at least a second feature of the reference image;
using the one or more image recognition techniques to automatically identify at least one of:
characteristics of at least one of the one or more secondary foci of the reference image, or
a positional relationship of the at least one of the one or more secondary foci to the primary focus;
scoring a set of candidate images based on the identified primary focus and the one or more secondary foci, the scoring for a particular candidate image, in the set of candidate images, being based on at least one of the following factors:
whether the particular candidate image includes the primary focus,
whether the particular candidate image includes the one or more secondary foci,
whether characteristics, of a particular secondary focus included in the candidate image, match characteristics of a corresponding secondary focus included in the reference image, or
whether a positional relationship, of the particular secondary focus included in the candidate image, matches a positional relationship of the corresponding secondary focus included in the reference image; and
ranking the set of candidate images based on the scoring.

9. The method of claim 8, wherein identifying the positional relationship of a particular secondary focus, in the reference image, to the primary focus, includes determining:
an angle between a reference point associated with the particular secondary focus and a reference point associated with the primary focus, and
a distance between the reference point associated with the particular secondary focus and the reference point associated with the primary focus.

10. The method of claim 8, wherein identifying the characteristics of a particular secondary focus, of the reference image, includes identifying:
a size of the particular secondary focus,
a shape of the particular secondary focus, or
one or more colors associated with the particular secondary focus.

11. The method of claim 8, wherein scoring the particular candidate image based on whether characteristics, of a particular secondary focus included in the candidate image, match characteristics of a corresponding secondary focus included in the reference image, includes:
identifying the corresponding secondary focus, included in the reference image, as corresponding to the particular secondary focus included in the candidate image based on identifying that the corresponding secondary focus, included in the reference image, is a most similar secondary focus, of the one or more secondary foci of the reference image, to the particular secondary focus included in the candidate image.

12. The method of claim 8, wherein scoring the particular candidate image includes:
weighting a particular one of the factors more heavily than another one of the factors when generating the score.

13. The method of claim 8, wherein scoring the particular candidate image includes:
scoring a plurality of features, associated with the particular candidate image, according to at least one of the factors, with respect to corresponding secondary foci of the reference image,
wherein the score for the particular candidate image is based on the scores for each of the plurality of features of the candidate image.

14. The method of claim 8, further comprising:
receiving information indicating that the primary focus of the reference image is associated with a locator;
identifying a highest scoring candidate image, based on the ranking; and
performing an automated selection on a portion of the highest scoring candidate image, based on the locator associated with the primary focus of the reference image.

15. A non-transitory computer-readable medium, storing a set of processor-executable instructions, which, when executed by one or more processors of a device, cause the one or more processors to:
use one or more image recognition techniques to automatically identify, in a reference image, a primary focus of the reference image, the primary focus being a first feature of the reference image;
use the one or more image recognition techniques to automatically identify, in the reference image, one or more secondary foci of the reference image, the secondary foci including at least a second feature of the reference image;
use the one or more image recognition techniques to automatically identify at least one of:
characteristics of at least one of the one or more secondary foci of the reference image, or
a positional relationship of the at least one of the one or more secondary foci to the primary focus;
score a set of candidate images based on the identified primary focus and the one or more secondary foci, the scoring for a particular candidate image, in the set of candidate images, being based on at least one of the following factors:
whether the particular candidate image includes the primary focus,
whether the particular candidate image includes the one or more secondary foci,
whether characteristics, of a particular secondary focus included in the candidate image, match characteristics of a corresponding secondary focus included in the reference image, or
whether a positional relationship, of the particular secondary focus included in the candidate image, matches a positional relationship of the corresponding secondary focus included in the reference image; and
rank the set of candidate images based on the scoring.

16. The non-transitory computer-readable medium of claim 15, wherein the processor-executable instructions, to identify the positional relationship of a particular secondary focus, in the reference image, to the primary focus, include processor-executable instructions to determine:
an angle between a reference point associated with the particular secondary focus and a reference point associated with the primary focus, and
a distance between the reference point associated with the particular secondary focus and the reference point associated with the primary focus.

17. The non-transitory computer-readable medium of claim 15, wherein the processor-executable instructions, to identify the characteristics of a particular secondary focus, of the reference image, include processor-executable instructions to identify:
- a size of the particular secondary focus,
- a shape of the particular secondary focus, or
- one or more colors associated with the particular secondary focus.

18. The non-transitory computer-readable medium of claim 15, wherein the processor-executable instructions, to score the particular candidate image based on whether characteristics, of a particular secondary focus included in the candidate image, match characteristics of a corresponding secondary focus included in the reference image, include processor-executable instructions to:
- identify the corresponding secondary focus, included in the reference image, as corresponding to the particular secondary focus included in the candidate image based on identifying that the corresponding secondary focus, included in the reference image, is a most similar secondary focus, of the one or more secondary foci of the reference image, to the particular secondary focus included in the candidate image.

19. The non-transitory computer-readable medium of claim 15, wherein the processor-executable instructions, to score the particular candidate image, include processor-executable instructions to:
- weight a particular one of the factors more heavily than another one of the factors when generating the score.

20. The non-transitory computer-readable medium of claim 15, wherein the processor-executable instructions, to score the particular candidate image, include processor-executable instructions to:
- score a plurality of features, associated with the particular candidate image, according to at least one of the factors, with respect to corresponding secondary foci of the reference image,
- wherein the score for the particular candidate image is based on the scores for each of the plurality of features of the candidate image.

* * * * *